United States Patent
Sakamoto et al.

(10) Patent No.: US 6,255,237 B1
(45) Date of Patent: Jul. 3, 2001

(54) LAMINATED SHEET

(75) Inventors: Akinobu Sakamoto, Sodegaura; Tatsuhiro Nagamatsu, Ichihara; Sakae Yamamoto, Ikoma-gun, all of (JP)

(73) Assignee: Sumitomo Chemical Company Limited, Osaka (JP)

( * ) Notice: Subject to any disclaimer, the term of this patent is extended or adjusted under 35 U.S.C. 154(b) by 0 days.

(21) Appl. No.: 09/418,580

(22) Filed: Oct. 15, 1999

(30) Foreign Application Priority Data

Oct. 19, 1998 (JP) .................................................. 10-296641

(51) Int. Cl.⁷ ............................... B32B 5/24; B32B 27/32
(52) U.S. Cl. ......................................... 442/370; 428/318.6
(58) Field of Search ........................ 442/370; 428/318.6

(56) References Cited

U.S. PATENT DOCUMENTS 5,585,185 * 12/1996 Smith et al. ....................... 428/411.1

FOREIGN PATENT DOCUMENTS

| 54-144484 | 11/1979 | (JP) . |
| 56-104054 | 8/1981 | (JP) . |
| 62-13173 B2 | 3/1987 | (JP) . |
| 524834 B2 | 4/1993 | (JP) . |
| 9226037 | 9/1997 | (JP) . |

* cited by examiner

Primary Examiner—Blaine Copenheaver
(74) Attorney, Agent, or Firm—Birch, Stewart, Kolasch & Birch, LLP.

(57) ABSTRACT

There is provided a laminated sheet comprising:
(i) a foamed sheet containing a polypropylene resin; and
(ii) a non-woven fabric,
wherein the foamed sheet has an expansion ratio, $\chi$, of from about 2 to 10, a cell diameter of not more than about 300 $\mu$m, and a thickness, h (cm), satisfying the following formula (1), $$(100/E(1-(1-1/\chi)^{2/3}))^{1/3} \leq h \leq 2 \quad (1)$$

wherein E (kgf/cm²) is a modulus of elasticity in bending of the resin which is to be a constituent of the foamed sheet and is not yet foamed.

15 Claims, 2 Drawing Sheets

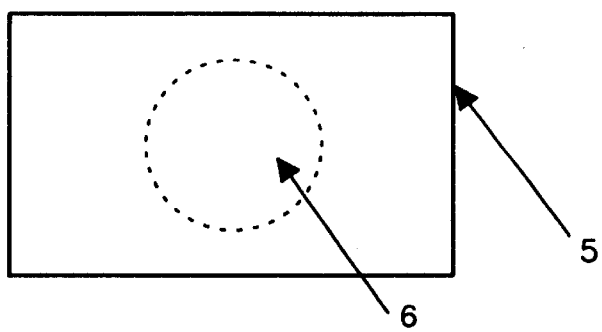
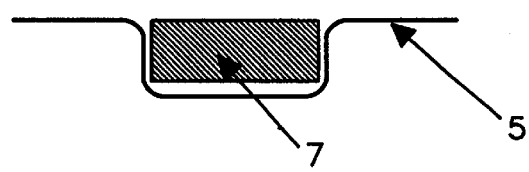
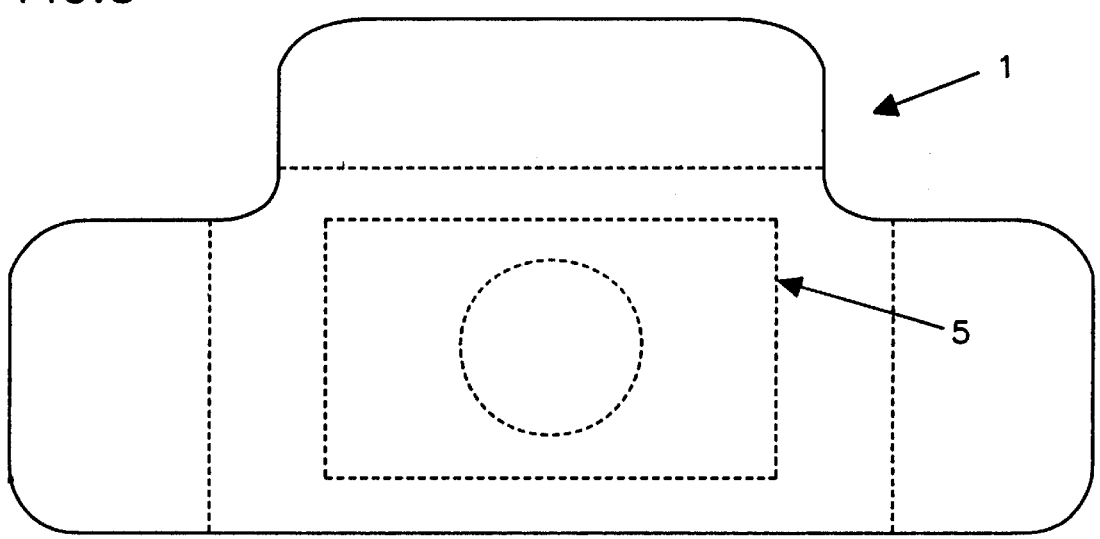

LAMINATED SHEET

FIELD OF THE INVENTION

The present invention relates to a laminated sheet. More specifically, the present invention relates to a laminated sheet which comprises (i)a specific foamed sheet containing a polypropylene resin and (ii)a non-woven fabric, and which is superior in its balance between rigidity and light-weight property.

BACKGROUND OF THE INVENTION

Japanese Patent Application Kokai (JP-A) No. 56-104054 discloses a laminated sheet obtained by melt-bonding a substrate with a non-woven fabric, the substrate being a foamed sheet of a polyolefin resin having high rigidity, a thickness of from 1.0 to 10.0 mm and an apparent density of not less than 0.25 g/cc. It is also disclosed therein that a main component of the substrate is a homopolymer or a copolymer of propylene, high density polyethylene or a mixture thereof.

The reference referred to above is incorporated herein by reference in its entirety.

Although the laminated sheet disclosed in the noted JP-A is superior in its rigidity, it is not superior in its balance between rigidity and light-weight property. Therefore, it cannot be said that the laminated sheet is satisfactorily used as materials of, for example, car interior parts.

SUMMARY OF THE INVENTION

Accordingly, it is an object of the present invention to provide a laminated sheet which is superior in its balance between rigidity and light-weight property, so that the laminated sheet can be suitably used, particularly as a car interior part.

The present inventors have undertaken extensive studies to obtain a laminated sheet which is so superior in its balance between rigidity and light-weight property as to be suitably used, particularly as a car interior part. As a result, it has been found that a laminated sheet comprising (i)a specific foamed sheet, which contains a polypropylene resin and has a high expansion ratio, and (ii)a non-woven fabric can give a desired laminated sheet that is superior in its balance between rigidity and light-weight property. And thereby the present invention has been obtained.

The present invention provides a laminated sheet comprising:

(i) a foamed sheet containing a polypropylene resin; and (ii) a non-woven fabric, wherein the foamed sheet has an expansion ratio, $\chi$, of from about 2 to 10, a cell diameter of not more than about 300 $\mu$m, and a thickness, h (cm), satisfying the following formula (1), $$(100/E(1-(1-1/\chi)^{2/3}))^{1/3} \leq h \leq 2 \quad (1)$$

wherein E is a modulus of elasticity in bending (kgf/cm$^2$) of the resin which is to be a constituent of the foamed sheet and is not yet foamed.

The present invention also provides a car interior part obtained from the laminated sheet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention.

In Figures, the numeral 1 denotes a trunk mat material, the numeral 2 denotes a ruled line, the numeral 3 denotes a foamed sheet, the numeral 4 denotes a non-woven fabric, the numeral 5 denotes a tray, the numeral 6 denotes a space for housing an article, and the numeral 7 denotes the article.

FIG. 3 shows a plane view of a tray 5 made from a laminated sheet in accordance with the present invention.

FIG. 4 shows a cross-sectional view of the tray 5 shown in FIG. 3.

FIG. 5 shows a plane view given for illustrating an example wherein the tray 5 shown in FIG. 3 is arranged under the trunk mat material 1 shown in FIG. 1.

DETAILED DESCRIPTION OF THE INVENTION

Figure 1:
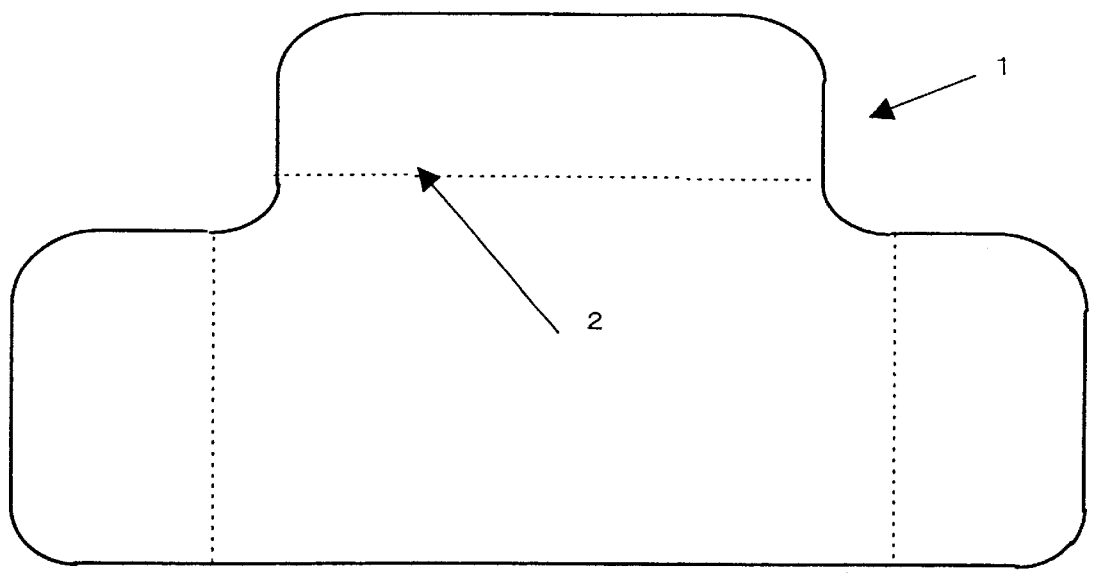
FIG. 1 shows a plane view of a trunk mat material 1 made from a laminated sheet in accordance with the present invention.

The term "polypropylene resin" used in the present invention means a thermoplastic crystalline resin containing a propylene homopolymer or copolymer of propylene with at least one monomer selected from the group consisting of ethylene and $\alpha$-olefins having 4 to 12 carbon atoms, in which copolymer a content of a repeating unit derived from ethylene is not more than about 10% by weight, and a content of a repeating unit derived from the $\alpha$-olefin is not more than about 30% by weight. If the content of a repeating unit derived from ethylene or the $\alpha$-olefin such as, for example, 1-butene, 4-methylpentene-1, 1-octene and 1-hexene, is outside the range mentioned above, the resulting copolymer may become insufficient in its crystallinity.

Among the polypropylene resins, preferred are those having a melt index (hereinafter referred to as "MI" for brevity) of from about 2 to 20 g/10 min., and a die swelling ratio (hereinafter referred to as "SR" for brevity) of not less than about 1.7. Specific examples of such preferred propylene resins are (i) a long chain branch-carrying PP, (ii) a high intrinsic viscosity component-containing PP and (iii) a mixture of (i) and (ii).

The term "long chain branch-carrying PP" means a polypropylene resin having a long chain branch. Examples thereof are those disclosed in Japanese Patent Application Kokai (JP-A) No. 62-121704. As a commercially available long chain branch-carrying PP, there are exemplified high melt strength polypropylene resins (HMS-PP stands therefor) produced and sold by Montell-JPO Co., Ltd., such as a propylene homopolymer (a commercial name: PF814, MI=3 g/10 min. and SR=2.36), and a propylene/ethylene copolymer (a commercial name: SD632, MI=3 g/10 min. and SR=2.16).

The term "high intrinsic viscosity component-containing pp" means a resin which has an intrinsic viscosity of less than about 3 dl/g, a ratio (Mw/Mn) of a weight average molecular weight (Mw) to a number average molecular weight (Mn) of less than about 10, and which comprises a crystalline polymer component (A) (hereinafter referred to as "polymer component (A)" for brevity) having an intrinsic viscosity of not less than about 5 dl/g and a crystalline polymer component (B) (hereinafter referred to as "polymer component (B)" for brevity) having an intrinsic viscosity of less than about 3 dl/g, wherein the polymer component (A) is prepared by polymerizing propylene alone or polymerizing propylene with at least one monomer selected from the group consisting of ethylene and α-olefins having 4 to 12 carbon atoms, the polymer component (B) is prepared by polymerizing propylene alone or polymerizing propylene with at least one monomer selected from the group consisting of ethylene and α-olefins having 4 to 12 carbon atoms, and a content of the polymer component (A), based on the sum of the polymer component (A) and the polymer component (B), is from about 0.05% by weight to 35% by weight. Here, a monomer composition of the polymer component (A) and that of the polymer component (B) may be the same or different from each other.

Preferable polymer components (A) and (B) are independently of each other a propylene homopolymer; an ethylene/propylene random copolymer having a content of a repeating unit derived from ethylene of not more than about 10% by weight; a propylene/butene random copolymer having a content of a repeating unit derived from butene of not more than about 30% by weight; or an ethylene/propylene/butene random copolymer having a content of a repeating unit derived from ethylene of not more than about 10% by weight and a content of a repeating unit derived from butene of not more than about 30% by weight.

As a process for producing the high intrinsic viscosity component-containing PP, there is exemplified a production process, which comprises the steps of:

(i) carrying out a first step of polymerization of propylene alone or propylene with at least one monomer selected from the group consisting of ethylene and α-olefins having 4 to 12 carbon atoms to obtain the polymer component (A) having an intrinsic viscosity of not less than about 5 dl/g, and (ii) carrying out, in the presence of the polymer component (A), a second step of polymerization of propylene alone or propylene with at least one monomer selected from the group consisting of ethylene and α-olefins having 4 to 12 carbon atoms to obtain the polymer component (B) having an intrinsic viscosity of less than about 3 dl/g.

The above process is hereinafter referred to as "successive polymerization process" for brevity.

The successive polymerization process may be a batchwise process or a continuous process. According to the batchwise process, for example, the polymer components (A) and (B) can be prepared in the same polymerization vessel. According to the continuous process, the polymer components (A) and (B) can be prepared in a manner such that a first step of polymerization is continuously carried out to prepare the polymer component (A) in a first one of two polymerization vessels arranged in a line, and the resulting polymer component (A) is continuously transferred to a second polymerization vessel, in which a second step of polymerization is continuously carried out to prepare the polymer component (B). The number of the polymerization vessels used in the continuous process may be three or more.

As another production process of the high intrinsic viscosity component-containing PP, there is exemplified a process wherein the polymer component (A) and the polymer component (B) produced separately are mixed with each other, the process being hereinafter referred to as "mixing process" for brevity. The successive polymerization process is preferred from a viewpoint of obtaining a high intrinsic viscosity component-containing PP having a high melt strength.

From a viewpoint that the high intrinsic viscosity component-containing PP having a higher melt strength gives a more favorable foamed sheet, an intrinsic viscosity of the polymer component (A) is preferably not less than about 6 dl/g, more preferably not less than 7 dl/g. Further, from a viewpoint that the high intrinsic viscosity component-containing PP having a higher melt strength gives a more favorable foamed sheet, a content of the polymer component (A) in the high intrinsic viscosity component-containing PP is preferably not less than about 0.3% by weight, and, from a viewpoint of elongation characteristic of the high intrinsic viscosity component-containing PP, a content thereof is preferably not more than 20% by weight. When the high intrinsic viscosity component-containing PP is produced according to the foregoing successive polymerization process, the content of the polymer component (A) can be controlled by appropriately adjusting conditions for the production of the polymer component (A).

From a viewpoint of obtaining the high intrinsic viscosity component-containing PP having a high melt strength, the intrinsic viscosity, $[\eta]_A$(dl/g), of the polymer component (A), and the content, $W_A$ (% by weight), thereof preferably satisfy a relationship represented by the following formula (2), which includes an exponential function.

$$W_A \geq 400 \times \mathrm{EXP}(-0.6 \times [\eta]_A) \qquad (2)$$

From a viewpoint of flowability and processability of the high intrinsic viscosity component-containing PP, the intrinsic viscosity of both the polymer component (B) and the high intrinsic viscosity component-containing PP is less than about 3 dl/g. From a viewpoint of appearance of the foamed sheet, Mw/Mn of the high intrinsic viscosity component-containing PP is less than about 10. When the high intrinsic viscosity component-containing PP is produced according to the foregoing successive polymerization process, the intrinsic viscosity of the polymer component (B) can be controlled by appropriately adjusting conditions for the production of the polymer component (B). Incidentally, the intrinsic viscosity, $[\eta]_B$(dl/g), of the polymer component (B) can be calculated from the intrinsic viscosity, $[\eta]$(dl/g), of the high intrinsic viscosity component-containing PP, the intrinsic viscosity, $[\eta]_A$(dl/g), and content, $W_A$ (% by weight), of the polymer component (A), and the content, $W_B$ (% by weight), of the polymer component (B) as mentioned hereinafter.

The high intrinsic viscosity component-containing PP can be produced with the aid of an olefin polymerization catalyst such as, for example, a catalyst comprising titanium, magnesium and a halogen as essential components. Examples of preferred catalysts are those disclosed in, for example, Japanese Patent Application Kokai (JP-A) No. 07-216017.

As a specific polymerization catalyst for the production of the high intrinsic viscosity component-containing PP, there is exemplified a catalyst comprising (a) a solid catalyst component, (b) an organoaluminum compound and (c) an electron donor compound, which are as mentioned below.

(a) Solid Catalyst Component

As a preferred solid catalyst component, there is exemplified a trivalent titanium compound-containing solid catalyst component which can be obtained by reducing a titanium compound represented by the formula, $Ti(OR_1)_aX_{4-a}$, wherein $R_1$ is a hydrocarbon group having 1 to 20 carbon atoms; X is a halogen atom; and a is a number satisfying $0<a\leq 4$, preferably $2\leq a\leq 4$, more preferably a=4, with an organomagnesium compound in the presence of both an ester compound and an Si—O bond-carrying organosilicone compound, i.e. an alkoxysilane compound represented by the formula, $Si(OR_2)_m(R_3)_{4-m}$, wherein $R_2$ and $R_3$ are independently of each other a hydrocarbon group having 1 to 20 carbon atoms, and m is a number satisfying $1\leq m\leq 4$, thereby obtaining a solid product, treating the obtained solid product with an ester compound, and then treating the treated solid product with either a mixture of an ether compound and titanium tetrachloride or a mixture of an ether compound, titanium tetrachloride and an ester compound.

As the alkoxysilane compound, a tetraalkoxysilane compound having 4 as m in the above formula is preferred. As the ester compound, there are exemplified mono or polycarboxylic acid esters, among which preferred are olefin carboxylic acid esters such as methacrylic acid esters and maleic acid esters and aromatic carboxylic acid esters such as phthalic acid esters, and particularly preferred are phthalic acid diesters. As the organomagnesium compound, Grignard compounds, dialkyl magnesium compounds and diaryl magnesium compounds are preferably enumerated, and as the ether compound, dialkyl ethers particularly such as dibutyl ether and diisoamyl ether are preferred.

(b) Organoaluminum Compound

As a preferred organoaluminum compound, there are exemplified triethylaluminum, triisobutylaluminum, a mixture of triethylaluminum and diethylaluminum chloride, and tetraethyldialmoxane.

(c) Electron Donor

As a preferred electron donor, there are exemplified tert-butyl-n-propyldimethoxysilane, tert-butylethyldimethoxysilane and dicyclopentyldimethoxysilane.

Generally speaking, with respect to amounts used of the foregoing components (a), (b) and (c), a molar ratio, (Al/Ti), of the Al atom present in the component (b) to the Ti atom present in the component (a) is from about 1 to 2000, preferably from about 5 to 1500, and a molar ratio of the component (c) to the Al atom present in the component (b) is from about 0.02 to 500, preferably from about 0.05 to 50.

The production process of the polymer components (A) and (B), namely, the polymerization process thereof, contains, for example, a solvent polymerization process wherein a hydrocarbon exemplified typically by hexane, heptane, octane, decane, cyclohexane, methylcyclohexane, benzene, toluene and xylene, is used as an inert solvent; a bulk polymerization process wherein a liquid monomer is used as a solvent; a gas phase polymerization process wherein a polymerization is carried out in a gaseous monomer; and a combination thereof. From a viewpoint of the polymerization activity and facilitation of a post-polymerization treatment, it is recommendable to select the bulk polymerization process, the gas phase polymerization process or their combination process.

In carrying out the production process of the polymer components (A) and (B), the larger the polymerization velocity, namely, the larger the catalyst activity, the better, from a viewpoint of the production efficiency of the polymer components (A) and (B), and from a viewpoint of controlling coloration and deterioration of heat resistance thereof, which seem to be caused by the catalyst remaining in the resulting polymer components.

With respect to the polymerization catalyst for the production of the polymer component (A), it is recommendable to select a polymerization catalyst capable of giving a production amount of the polymer component (A) of not less than about 2000 g per 1 g of the solid catalyst component and 1 hour of the polymerization period of time. With respect to the polymerization catalyst for the production of the polymer component (B), a production amount of the polymer component (B) per 1 g of the solid catalyst component and 1 hour of the polymerization period of time is preferably about 2 times or more (not less than about 4000 g) more preferably about 3 times or more, that of the polymer component (A).

A polymerization temperature for the production of the polymer component (A) and that for the production of the polymer component (B) may be the same or different, and they are usually from about 20 to 150° C., preferably from about 30 to 95° C.

The high intrinsic viscosity component-containing PP thus obtained may be, if desired, subjected to after-treatments such as deactivation of the catalyst, removal of any solvent, removal of any monomer, drying and granulation.

When a mixture of the long chain branch-carrying PP and the high intrinsic viscosity component-containing PP is used as the polypropylene resin in the present invention, MI and SR of said mixture are preferably from about 2 to 20 g/10 min., and not less than about 1.7, respectively.

The polypropylene resin used in the present invention may be used in combination with other resins or various kinds of additives such as primary anti-oxidants, secondary anti-oxidants, ultraviolet ray absorbers, antistatic agents, pigments and fillers, as far as the objects and the effects of the present invention are not impaired.

Examples of said other resins are low density polyethylene having a density of not higher than about 0.93 g/cm$^2$, which contains ultra low density polyethylene (ULDPE) having a density of not higher than about 0.91 g/cm$^2$, mean density polyethylene, high density polyethylene having a density of not lower than about 0.94 g/cm$^2$, an ethylene/α-olefin copolymer and an ethylene/vinyl acetate copolymer. Of these, low density polyethylene is preferred.

When using the polypropylene resin in combination with other resins or various kinds of additives, it is preferred that the polypropylene resin is a main ingredient. From a viewpoint of rigidity and heat resistance of the foamed sheet obtained, a blending proportion of the polypropylene resin is usually not less than about 60% by weight, preferably not less than about 70% by weight, more preferably not less than about 80% by weight.

An expansion ratio, $\chi$, of the foamed sheet used in the present invention is from about 2 to 10 times. From a viewpoint of a light-weight property for the laminated sheet in accordance with the present invention, it is not preferable to use a foamed sheet having an expansion ratio of less than about 2. From a viewpoint of obtaining a laminated sheet which is more superior in its light-weight property, the expansion ratio is preferably not less than about 4, more preferably not less than about 6. When the expansion ratio exceeds about 10, it frequently occurs that any advantage corresponding to such an increase of the expansion ratio cannot be obtained, and therefore, the ratio is usually not higher than about 10. The expansion ratio can be controlled by adjusting an amount of a foaming agent added or an expanding gas fed under pressure as mentioned hereinafter. The term "expansion ratio" means a ratio of a density of a non-foamed resin to that of a foamed resin, and said ratio can be measured by an underwater substitution method (A method) according to JIS K 7112.

A cell diameter of the foamed sheet used in the present invention is not more than about 300 μm, preferably not more than about 250 μm. It is not preferable to use a foamed sheet having a cell diameter of more than about 300 μm, because when the laminated sheet is made of such a foamed sheet, there may be encountered defects such that dust, dirt or water easily penetrates into edge surfaces of the foamed sheet constituting the laminated sheet, or a ruled line portion of an article, which is prepared by way of a ruled line-processing of the laminated sheet as mentioned hereinafter, is made inferior in its hinging property, or moreover there occurs a poor appearance such as blister on an article formed by subjecting the laminated sheet to thermoforming such as vacuum forming. A lower limit of the cell diameter is not particularly limited, and the finer the cell diameter, the better.

A thickness, h (cm), of the foamed sheet used in the present invention satisfies the formula (1) from a viewpoint of balance between light-weight property and rigidity. The symbol "E" in the formula (1) is a modulus of elasticity in bending of the resin, which is to be a constituent of the foamed sheet, and not yet foamed. The modulus of elasticity in bending is usually in the range of from about 10000 to 20000 kgf/cm$^2$.

In general, a light-weight property of a sheet such as a foamed sheet and a non-woven fabric can be evaluated by weight per unit area (hereinafter referred to as "unit weight") of the sheet, and the light-weight property is increased with decrease of the unit weight. A unit weight of the foamed sheet used in the present invention is preferably not more than about 2000 g/m$^2$, more preferably not more than about 1000 g/m$^2$.

Further in general, rigidity of a sheet can be evaluated by an elastic gradient in bending. The elastic gradient in bending can be measured according to a bending test of JIS K7203, and stands for a load under which the sheet of 1 cm width produces a deflection of 1 cm. The rigidity of a sheet is increased with increase of the elastic gradient in bending. An elastic gradient in bending of the foamed sheet used in the present invention is preferably not less than about 0.4 kgf/cm·1 cm width, more preferably not less than about 1.0 kgf/cm·1 cm width, much more preferably not less than about 1.5 kgf/cm·1 cm width.

When the thickness of the foamed sheet is outside the range defined by the formula (1), it is not easy to obtain the laminated sheet which is superior in balance between light-weight property and rigidity. That is, in such a case, there can be only obtained a laminated sheet which is superior in its light weight property but is not superior in its rigidity, or else a laminated sheet which is superior in its rigidity but is not superior in its light-weight property. From a viewpoint of light-weight property, a more preferred thickness is not more than about 1 cm.

The foamed sheet having a thickness, h (cm), satisfying the formula (1) can be obtained by measuring, in advance, a modulus of elasticity in bending of a resin used for the production of the foamed sheet, controlling an amount of a foaming agent or an expanding gas, and controlling a lip gap of die tip portion in an extruder as mentioned below.

A process for producing the foamed sheet used in the present invention is not particularly limited. There is exemplified an extrusion foaming process known in the art, comprising the steps of:

(1) feeding a mixture of a resin used for the production of a foamed sheet and a thermal decomposition type foaming agent into a material feeding inlet, that is, a hopper;

(2) causing melting of the resin and generation of a gas by decomposition of the foaming agent in an extruder;

(3) thoroughly kneading the melted resin with the generated gas to obtain a uniform mixture;

(4) cooling the uniform mixture to a temperature suitable for expansion;

(5) extruding the mixture from dies to cause expansion; and (6) cooling the extrudate through a drawing machine to obtain a desired foamed sheet.

In the above, an inert gas such as nitrogen gas and carbonic acid gas can be used as an expanding gas in place of the thermal decomposition type foaming agent, provided that the inert gas is pressure-fed directly in the extruder. The thermal decomposition type foaming agent and the inert gas can be used together with each other.

From a viewpoint of obtaining the foamed sheet having a fine cell diameter, it is recommendable to use as the expanding gas a mixed gas of nitrogen gas and carbonic acid gas. In this case, there are exemplified (i)a process wherein the mixed gas of nitrogen gas and carbonic acid gas is directly fed into the extruder, and (ii)a process wherein a thermal decomposition type foaming agent mainly generating nitrogen gas by its decomposition and a thermal decomposition type foaming agent mainly generating carbonic acid gas by its decomposition are used together with each other. When two or more kinds of the thermal decomposition type foaming agents are used together, these foaming agents may be used separately or in the form of a mixture obtained by mixing these foaming agents in advance. As the mixed foaming agent, preferred are those comprising thermal decomposition type foaming agents mainly generating nitrogen gas and thermal decomposition type foaming agents mainly generating carbonic acid gas.

Examples of the thermal decomposition type foaming agents mainly generating nitrogen gas are azodicarbonamide, azobisisobutyronitrile, p-toluenesulfonylhydrazide and p,p'-oxy-bis(benzenesulfonylhydrazide). Of these, azodicarbonamide is preferred. These foaming agents maybe used together with each another.

Examples of the thermal decomposition type foaming agents mainly generating carbonic acid gas are sodium bicarbonate, ammonium carbonate and ammonium bicarbonate. Of these, sodium bicarbonate is preferred. These foaming agents may be used together with each another.

Preferred foaming agents are those which have a decomposition temperature of about 140 to 180° C. When a forming agent having a decomposition temperature exceeding about 180° C. is used, such a foaming agent may be used in combination with a foaming auxiliary. Examples of the foaming auxiliary are zinc oxide, zinc nitrate, basic zinc carbonate, zinc stearate, lead phthalate, lead carbonate, urea and glycerol. In addition, it is also recommendable to use a powdery cell-nucleating agent such as calcium carbonate, talc and silica in combination with a foaming agent.

In case of combination use of the thermal decomposition type organic foaming agents mainly generating nitrogen gas and the thermal decomposition type inorganic foaming agents mainly generating carbonic acid gas, a weight ratio of the former to the latter is from about 1/99 to 30/70, preferably from about 1/99 to 20/80, more preferably from about 1/99 to 10/90, from a viewpoint that the foamed sheet obtained has a superior surface smoothness due to a fine and uniform cell diameter, in other words, it is superior in its appearance.

In case of using the mixed gas of nitrogen gas and carbonic acid gas as the foaming agent, a volume ratio of nitrogen gas to carbonic acid gas is from about 1/99 to 30/70, preferably from about 1/99 to 20/80, more preferably from about 1/99 to 10/90. In this case, it is recommendable to use a powdery cell-nucleating agent mentioned above in combination with the foaming gas.

An extruder used for producing the foamed sheet of the present invention is not particularly limited, and may be one capable of at least thoroughly kneading and unifying a mixture of a resin and a gas and controlling temperature to a level suitable for completing the expansion. The extruder contains, for example, a single screw extruder and a multi screw extruder. As the multi screw extruder, a twin screw extruder is usually used, wherein rotation direction of each screw may be the same or different with each other The twin screw extruder may be a parallel twin screw extruder having screws of a constant diameter, or a slanting twin screw extruder having screws of a smaller diameter at the tip portion. When the twin screw extruder is used, the expanding gas leaks easily out of the hopper, and therefore it is recommendable to provide a sealing segment to the screws. Thus, from a viewpoint of low costs and little leakage of the gas out of the hopper, it is preferred to use the single screw extruder. In addition, it is allowable to use a tandem extruder, which is a combination of a single screw extruder and a multi screw extruder. Dies of the extruder used in the present invention contain flat dies and circular dies. A lip gap present at a tip of dies can be determined to control a thickness of the foamed sheet obtained.

The non-woven fabric used in the present invention gives mainly flexibility and a beautiful appearance to the laminated sheet in accordance with the present invention, and can be laminated to at least one surface of the foamed sheet. Examples of the non-woven fabric are needle-punched non-woven fabric and spun-bonded non-woven fabric. of these, particularly preferred is the needle-punched non-woven fabric produced by needling a web with a special needle to effect interweaving.

A resin-made yarn constituting the non-woven fabric contains a single yarn made of, for example, nylon, polyester or polypropylene, and a union yarn thereof. From a viewpoint of recyclability of the laminated sheet, the non-woven fabric made of the same resin as that used for the foamed sheet is particularly preferred, because it is not necessary to divide the laminated sheet of the present invention into the foamed sheet and the non-woven fabric when recycling.

A unit weight of the non-woven fabric used in the present invention is not particularly limited, and it is permissible to select a non-woven fabric having a suitable unit weight depending on the uses of the laminated sheet of the present invention. The unit weight thereof is usually not more than about 200 g/m$^2$. When a non-woven fabric having a lower unit weight is used, the foamed sheet may be seen through the non-woven fabric in the application where the laminated sheet is seen from the side of the non-woven fabric; or the hand touch property and cushion property peculiar to the non-woven fabric may be poor. Therefore, in such a case, it is recommendable to apply the laminated sheet in a manner such that the non-woven fabric cannot be seen. If the laminated sheet is applied in a manner such that the non-woven fabric can be seen, it is recommendable to use a non-woven fabric having a unit weight of about 80 to 200 g/m$^2$. In general, when the foamed sheet and the non-woven fabric have the same or the similar color (for example, both being black), the laminated sheet obtained is more favorable in its appearance.

A process for laminating a foamed sheet and a non-woven fabric is not particularly limited and contains, for example, the following processes (1) to (7). Among them, the processes (3), (4) and (5) are preferred from an economical point of view.

(1) A process wherein the foamed sheet and the non-woven fabric are bonded with the aid of an adhesive agent to complete a desired lamination.

(2) A process wherein the foamed sheet and the non-woven fabric are sandwich-laminated through extruding a molten thermoplastic resin-made film between them to complete a desired lamination.

(3) A process wherein the foamed sheet and the non-woven fabric are press-bonded through placing the foamed sheet, whose surface has been heat-melted in advance, such as with a heater or flames, upon the non-woven fabric to complete a desired lamination.

(4) A process wherein the foamed sheet and the non-woven fabric are press-bonded through placing the foamed sheet immediately after the extrusion-foaming, whose surface is still in a molten state, upon the non-woven fabric to complete a desired lamination.

(5) A process wherein the foamed sheet and the non-woven fabric are press-bonded through placing the non-woven fabric, whose back side has been heat-melted, such as with a heater or flames, upon the foamed sheet, whose surface has been pre-heated or melted, to complete a desired lamination. In this process, the lamination between the foamed sheet and the non-woven fabric can be facilitated by using, as the non-woven fabric, a two-layered non-woven fabric backed with a film or another non-woven fabric made of a resin having a melting point lower than that of both resins used for the foamed sheet and the essential non-woven fabric.

(6) A process wherein the foamed sheet and the non-woven fabric are press-bonded through spreading thermoplastic resin powders on the surface of the foamed sheet, heat-melting the powders and then placing the foamed sheet upon the non-woven fabric to complete a desired lamination.

(7) A process wherein the foamed sheet and the non-woven fabric are placed upon one another, followed by needling with a special needle to effect interweaving, wherein the yarn constituting the non-woven fabric is buried in the foamed sheet, thereby completing a desired lamination.

The laminated sheet in accordance with the present invention can be processed through punching with a known press machine to obtain an article having a desired shape, or can be subjected to a ruled line-processing at a desired position. How to obtain the ruled line is not particularly limited, and the following processes (1) to (3)are exemplified. Among them, the processes (1) and (2) are preferred from a viewpoint of bending durability of the ruled article.

(1) A process of compressing a predetermined line in the laminated sheet by a mechanical means at room temperature.

(2) A process of compressing a predetermined line in the laminated sheet by a mechanical means under heating.

(3) A process of providing a slit having a predetermined depth in the laminated sheet by means of a cutter.

In addition, the laminated sheet of the present invention can be subjected to thermoforming such as vacuum forming to obtain an article having a desired shape, and then a margin of the shaped article can be punched with a press machine to obtain an article beautiful in its edge surface and appearance. The thermoforming process is not particularly limited. As one of preferred thermoforming processes, there is exemplified a process wherein the laminated sheet is uniformly heated at a temperature of from about 130 to 200° C. with a heater, and then is formed into a desired shape using a mold kept at a proper temperature, followed by cooling.

According to the present invention, there is provided a laminated sheet which comprises (i) a foamed sheet having a high expansion ratio and fine cells and (ii) a non-woven fabric. The laminated sheet is superior in its balance between light-weight property and rigidity. The laminated sheet can be subjected to a ruled line processing and thermoforming such as vacuum forming, and is superior in its recyclability. The cells of the foamed sheet are very fine, so that (1) there is no occurrence of poor appearance such as blister even through thermoforming, (2) the edge surface thereof, which is punched, is beautiful, (3) the edge thereof is resistant to penetration of dust, dirt and water, and (4) an edge surface treatment thereof is not needed. Therefore, a formed article having a beautiful appearance can be obtained from the laminated sheet of the present invention. A lined article obtained from the laminated sheet in accordance with the present invention is so superior in its bending durability that it is particularly suitably used as car interior parts such as trunk mat materials and ceiling materials.

EXAMPLE

The present invention is illustrated in more detail with reference to the following Examples, which are only illustrative, and are not limitative for the scope of the present invention.

Analysis values in Examples and Comparative Examples are those obtained as follows:

1. Melt Index (MI)

Measured according to JIS K7210 at a temperature of 230° C. under a load of 2.16 kgf with respect to a resin having a repeating unit derived from propylene as a main component, and at a temperature of 190° C. under a load of 2.16 kgf with respect to a resin having a repeating unit derived from ethylene as a main component.

2. Die Swelling Ratio (SR)

Measured according to JIS K7199 at a temperature of 185° C. and a shear rate of 121 sec$^{-1}$ using a capillary of a flat inflow angle having a length of 20 mm and a diameter of 1 mm.

3. Composition Analysis

A content, $W_A$(% by weight), of the polymer component (A) and a content, $W_B$(% by weight), of the polymer component (B) in the high intrinsic viscosity component-containing PP produced by the successive polymerization process were calculated from the material balance in the production of the high intrinsic viscosity component-containing PP.

4. Intrinsic Viscosity

The intrinsic viscosity, $[\eta]_A$, of the polymer component (A) in the high intrinsic viscosity component-containing PP produced by the successive polymerization process was obtained by measuring the product obtained in the first step of polymerization. The $[\eta]_A$ and the intrinsic viscosity, $[\eta]$, of the high intrinsic viscosity component-containing PP were measured in tetralin at a temperature of 135° C. using an Ubbellohde viscometer.

The intrinsic viscosity, $[\eta]_B$, of the polymer component (B) in the high intrinsic viscosity component-containing PP was calculated by the following equation.

$$[\eta]=[\eta]_A \times W_A/100+[\eta]_B \times W_B/100$$

5. Mw/Mn Value

Measured by a gel permeation chromatography (G.P.C.) under the following conditions.

Machine: 150 CV (manufactured by MILIPOREWATERS COMPANY)

Column: Shodex M/S 80

Measurement temperature: 145° C.

Solvent: o-Dichlorobenzene

Concentration of sample: 5 mg/8 ml

The calibration curve was prepared using a standard polystyrene (authentic sample: NBS706, Mw/Mn=2.0). The Mw/Mn of said polystyrene measured under the foregoing conditions was found to be 1.9 to 2.0.

6. Modulus of Elasticity in Bending

Measured according to JIS K7203 using a test piece having a size of 10 mm width×150 mm length at a bending ratio of 10 mm/min. within a span of 100 mm.

7. Elastic Gradient in Bending

A load-strain relationship curve was obtained by measuring a test piece having a size of 50 mm width×150 mm length at a bending ratio of 10 mm/min., within a span of 100 mm, and the elastic gradient in bending per 1 cm width was calculated by dividing a gradient of tangent line in a rising portion of said curve by the test piece width (50 mm).

8. Cell Diameter

According to JIS K6402, a value obtained by dividing a thickness of the foamed sheet by the number of cells present on a straight line in the thickness direction was assigned to the cell diameter.

9. Frequency Resistible to Bending at a Ruled Portion

Measured according to JIS P8115 using a test piece having a size of 15 mm width×110 mm length.

Example 1

In a tumbler, 85 parts by weight of a propylene homopolymer (corresponding to the polypropylene resin) having MI of 6 g/10 min. and SR of 1.9 and 15 parts by weight of an ethylene-propylene copolymer (corresponding to the other resin) having MI of 1 g/10 min., a density of 0.87 g/cm$^3$ and a repeating unit derived from propylene of 22% by weight were blended, and the resulting blend was melt-kneaded under conditions of a cylinder temperature of 220° C., a die temperature of 220° C. and a screw revolution of 40 rpm in an extruder of 90 mm diameter equipped with strand dies, thereby obtaining a thermoplastic resin composition having a modulus of elasticity in bending of 15600 kgf/cm$^2$ and a density of 0.9 g/cm$^3$.

In a tumbler, 100 parts by weight of the resin composition obtained above, 1.4 parts by weight of a mixed foaming agent consisting of 8% by weight of azodicarbonamide and 92% by weight of sodium bicarbonate, 1.4 parts by weight of zinc oxide (a foaming auxiliary) and 1.5 parts by weight of a black pigment master batch were blended, and the resulting blend was extrusion-foamed through an extruder of 120 mm diameter equipped with flat dies of 1500 mm width (cylinder temperature: 170 to 200° C. at a supplying screw zone, 190 to 200° C. at a compression zone and 160 to 170° C. at a weighing zone; dies temperature: 170° C.; screw revolution: 40 rpm; and extrusion output: 200 kg/hr). The extrudate was draw-molded through a polishing roll kept at a temperature of 60 to 90° C., thereby obtaining a foamed sheet.

The foamed sheet obtained was found to have a thickness of 0.5 cm, a density of 0.3 g/cm$^3$, a cell diameter of 150 μm, a unit weight of 1517 g/m$^2$, and an elastic gradient in bending of 1.85 kgf/cm·1 cm width. The expansion ratio was found to be 3 times on the basis of the calculation, i.e. the density of the resin composition 0.9 g/cm³/the density of the foamed sheet 0.3 g/cm³=0.9/0.3=3, and the thickness of the foamed sheet, 0.5 cm, was found to satisfy the foregoing formula (1) on the basis of the calculation wherein E and $\chi$ in the left side of the formula (1) were substituted with 15600 kgf/cm² and 3 times, respectively, whereby a value of the left side of the formula (1) was given to be 0.3 cm.

Both surfaces of the above foamed sheet were heated through an infrared heater arranged immediately after the polishing roll draw-molding apparatus, and two kinds of polypropylene-made non-woven fabrics having unit weights of 60 g/cm² and 100 g/cm², respectively, were press-bonded to the heated sheet obtained above with a roll to obtain a laminated sheet comprising the foamed sheet interposed between the non-woven fabrics.

Figure 2:
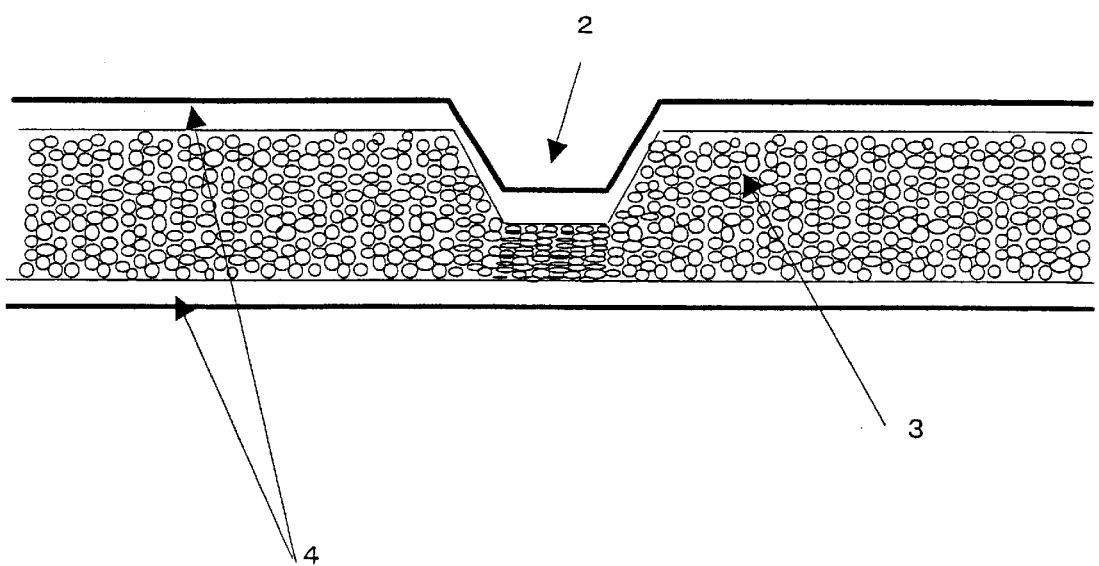
FIG. 2 shows a cross-sectional view given for illustrating a shape of a ruled line 2 in the trunk mat material 1 shown in FIG. 1.

The laminated sheet obtained was punched with a press machine and at the same time provided with a ruled line to obtain a trunk mat material 1 suitable for a car interior part as shown in FIG. 1. With respect to the trunk mat material obtained, no edge surface treatment was needed because no burr was observed at the edge surface and the appearance thereof was beautiful due to the fineness of the cells. The ruled line 2 formed by compressing by a mechanical means was as shown in FIG. 2, and its hinging property was superior, being not less than 10000 times in frequency resistible to bending.

On the other hand, the laminated sheet was heated uniformly at 160° C. with a heater and was vacuum-formed using a male-female mold kept at 50° C. to obtain a molded product. A margin of the molded product was punched to obtain a tray 5 as shown in FIGS. 3 and 4. As shown in FIG. 5, the tray 5 can be arranged under the trunk mat material 1 for housing goods such as a spare tire and tools. With respect to the tray 5, the edge surfaces were beautiful because cells of the foamed sheet were fine and no blister caused while vacuum forming was observed, and thus the appearance thereof was found to be superior.

Example 2

Using 85 parts by weight of a propylene homopolymer (long chain branch-carrying PP, PF814 sold by Montell-JPO Co., Ltd.) having MI of 3 g/10 min and SR of 2.36 and 15 parts by weight of an ethylene-propylene copolymer (corresponding to the other resin) having MI of 1 g/10 min., a density of 0.87 g/cm³ and a repeating unit derived from propylene of 22% by weight, Example 1 was repeated to obtain a thermoplastic resin composition having a modulus of elasticity in bending of 12500 kgf/cm² and a density of 0.9 g/cm³.

The foamed sheet obtained from the thermoplastic resin composition obtained above in a manner similar to that of Example 1 was found to have a thickness of 0.5 cm, a density of 0.3 g/cm³, a cell diameter of 250 μm, an expansion ratio of 3 times, a unit weight of 1517 g/m², and an elastic gradient in bending of 1.48 kgf/cm·1 cm width. The thickness, 0.5 cm, was found to satisfy the formula (1).

In a manner similar to that of Example 1, the resulting foamed sheet and the non-woven fabric were bonded to each other to obtain a laminated sheet, from which a trunk mat material 1 and tray 5 were fabricated. The trunk mat material 1 obtained had good edge surfaces and exhibited a superior hinging property of not less than 10000 times. With respect to the tray 5, a little blister caused while molding was observed, but the appearance was found to be superior.

Example 3

Example 2 was repeated, except that the mixed foaming agent was used in an amount of 3.5 parts by weight, thereby obtaining a foamed sheet having a thickness of 0.6 cm, a density of 0.15 g/cm³, a cell diameter of 300 μm, an expansion ratio of 6 times, a unit weight of 910 g/m², and an elastic gradient in bending of 1.24 kgf/cm·1 cm width. The thickness, 0.6 cm, was found to satisfy the formula (1).

In a manner similar to that of Example 2, the resulting foamed sheet and the non-woven fabric were bonded to each other to obtain a laminated sheet, from which a trunk mat material 1 and tray 5 were fabricated. The trunk mat material 1 obtained had good edge surfaces and exhibited a superior hinging property of not less than 10000 times. With respect to the tray 5, a little blister caused while molding was observed, but the appearance was found to be superior.

Example 4

Using 85 parts by weight of a high intrinsic viscosity component-containing Pp obtained by a successive polymerization process and 15 parts by weight of an ethylene-propylene copolymer (corresponding to the other resin) having MI of 1 g/10 min., a density of 0.87 g/cm³ and a repeating unit derived from propylene of 22% by weight, Example 1 was repeated to obtain a thermoplastic resin composition having a modulus of elasticity in bending of 17000 kgf/cm² and a density of 0.9 g/cm³. The above high intrinsic viscosity component-containing PP was found to have an intrinsic viscosity, $[\eta]$, of 1.8 dl/g, Mw/Mn of 6.2, MI of 9 g/10 min. and SR of 2.5, and further found to consist of 8% by weight of a polymer component (A) having an intrinsic viscosity, $[\eta]_A$, of 8 dl/g and 92% by weight of a polymer component (B) having an intrinsic viscosity, $[\eta]_B$, of 1.26 dl/g.

The foamed sheet obtained in a manner similar to that of Example 1 using the thermoplastic resin composition obtained above was found to have a thickness of 0.5 cm, a density of 0.3 g/cm³, a cell diameter of 150 μm, an expansion ratio of 3 times, a unit weight of 1517 g/m², and an elastic gradient in bending of 2.01 kgf/cm·1 cm width. The thickness, 0.5 cm, was found to satisfy the formula (1).

In a manner similar to that of Example 1, the resulting foamed sheet and the non-woven fabric were bonded to each other to obtain a laminated sheet, from which a trunk mat material 1 and tray 5 were fabricated. The trunk mat material 1 obtained had good edge surfaces and exhibited a superior hinging property of not less than 10000 times. With respect to the tray 5, no blister caused while molding was observed, and thus the appearance was found to be superior.

Example 5

Using 85 parts by weight of a high intrinsic viscosity component-containing PP obtained by a successive polymerization process and 15 parts by weight of an ethylene-propylene copolymer (corresponding to the other resin) having MI of 1 g/10 min., a density of 0.87 g/cm³ and a repeating unit derived from propylene of 22% by weight, Example 1 was repeated to obtain a thermoplastic resin composition having a modulus of elasticity in bending of 17000 kgf/cm² and a density of 0.9 g/cm³. The above high intrinsic viscosity component-containing PP was found to have an intrinsic viscosity, $[\eta]$, of 2.29 dl/g, Mw/Mn of 6.7, MI of 4.4 g/10 min. and SR of 3.26, and further found to consist of 14.4% by weight of a polymer component (A) having an intrinsic viscosity, $[\eta]_A$, of 7.5 dl/g and 85.56% by weight of a polymer component (B) having an intrinsic viscosity, $[\eta]_B$, of 1.41 dl/g.

Using the thermoplastic resin composition obtained above, Example 1 was repeated, except that the mixed foaming agent was used in an amount of 3.5 parts by weight, thereby obtaining a foamed sheet having a thickness of 0.6 cm, a density of 0.15 g/cm³, a cell diameter of 200 μm, an expansion ratio of 6 times, a unit weight of 910 g/m², and an elastic gradient in bending of 1.73 kgf/cm·1 cm width. The thickness, 0.6 cm, was found to satisfy the formula (1).

In a manner similar to that of Example 1, the resulting foamed sheet and the non-woven fabric were bonded to each other to obtain a laminated sheet, from which a trunk mat material 1 and tray 5 were fabricated. The trunk mat material 1 obtained had good edge surfaces and exhibited a superior hinging property of not less than 10000 times. With respect to the tray 5, no blister caused while molding was observed, and thus the appearance was found to be superior.

Example 6

Example 5 was repeated, except that an expansion-foaming condition was changed to enlarge the open of lip gap, thereby obtaining a foamed sheet having a thickness of 0.8 cm, a density of 0.15 g/cm³, a cell diameter of 200 μm, an expansion ratio of 6 times, a unit weight of 1213 g/m², and an elastic gradient in bending of 4.1 kgf/cm·1 cm width. The thickness, 0.8 cm, was found to satisfy the formula (1).

In a manner similar to that of Example 1, the resulting foamed sheet and the non-woven fabric were bonded to each other to obtain a laminated sheet, from which a trunk mat material 1 and tray 5 were fabricated. The trunk mat material 1 obtained had good edge surfaces and exhibited a superior hinging property of not less than 10000 times. With respect to the tray 5, no blister caused while molding was observed, and thus the appearance was found to be superior.

Example 7

Example 5 was repeated, except that the foaming agent was used in an amount of 5.1 parts by weight, thereby obtaining a foamed sheet having a thickness of 0.8 cm, a density of 0.11 g/cm³, a cell diameter of 250 μm, an expansion ratio of 8.2 times, a unit weight of 890 g/m², and an elastic gradient in bending of 2.98 kgf/cm·1 cm width. The thickness, 0.8 cm, was found to satisfy the formula (1).

In a manner similar to that of Example 1, the resulting foamed sheet and the non-woven fabric were bonded to each other to obtain a laminated sheet, from which a trunk mat material 1 and tray 5 were fabricated. The trunk mat material 1 obtained had good edge surfaces and exhibited a superior hinging property of not less than 10000 times. With respect to the tray 5, a little blister caused while molding was observed, but the appearance was found to be superior.

Comparative Example 1

Using 85 parts by weight of a propylene homopolymer having MI of 6 g/10 min. and SR of 1.6 and 15 parts by weight of an ethylene-propylene copolymer having MI of 1 g/10 min., a density of 0.87 g/cm³ and a repeating unit derived from propylene of 22% by weight, Example 1 was repeated to obtain a thermoplastic resin composition having a modulus of elasticity in bending of 15600 kgf/cm² and a density of 0.9 g/cm³.

The foamed sheet obtained in a manner similar to that of Example 1 using the thermoplastic resin composition obtained above was found to have a thickness of 0.2 cm, a density of 0.8 g/cm³, an expansion ratio of 1.1 times and a cell diameter of as large as 800 μm. The expanding gas leaked remarkably, the expansion ratio was low, and the appearance of the foamed sheet obtained was inferior, and therefore the foamed sheet obtained was not worthy to be evaluated.

Comparative Example 2

Example 1 was repeated, except that 1.47 parts by weight of sodium bicarbonate was used in place of the mixed foaming agent, thereby obtaining a foamed sheet having a thickness of 0.5 cm, a density of 0.3 g/cm³, an expansion ratio of 3 times, a unit weight of 1517 g/m², and an elastic gradient in bending of 1.85 kgf/cm·1 cm width. The cell diameter thereof was found to be as large as 1500 μm.

In a manner similar to that of Example 1, the resulting foamed sheet and the non-woven fabric were bonded to each other to obtain a laminated sheet, from which a trunk mat material and tray were fabricated. The appearance of the edge surfaces of the trunk mat material obtained was inferior because of too large cells of the foamed sheet, such that edge surface treatment was needed, and its hinging property was found to be as poor as 6000 times. With respect to the tray, many blisters caused while molding were observed, and thus the appearance thereof was found to be inferior.

Comparative Example 3

Example 4 was repeated, except that circular dies of 100 mm diameter were used and the foaming agent was used in an amount of 3.5 parts by weight, thereby obtaining a foamed sheet. The foamed sheet was found to have a thickness of 0.2 cm, a density of 0.15 g/cm³, a cell diameter of 200 μm, an expansion ratio of 6 times, a unit weight of 303 g/m², and an elastic gradient in bending of 0.06 kgf/cm·1 cm width. The rigidity in bending thereof was remarkably low, the thickness, 0.2 cm, did not satisfy the formula (1), and thus it was not worthy to be evaluated through bonding with a non-woven fabric.

What is claimed is:

1. A laminated sheet comprising:
   (i) a foamed sheet containing a polypropylene resin; and
   (ii) a non-woven fabric,
   wherein the foamed sheet has an expansion ratio, $\chi$, of from about 2 to 10, a cell diameter of not more than about 300 μM, and a thickness, h (cm), satisfying the following formula (1), $$(100/E(1-(1-1/\chi)^{2/3}))^{1/3} \leq h \leq 2 \quad (1)$$

wherein E (kgf/cm²) is a modulus of elasticity in bending of the resin which is to be a constituent of the foamed sheet and is not yet foamed.

2. The laminated sheet according to claim 1, wherein the polypropylene resin has a melt index of from about 2 to 20 g/10 min., and a die swelling ratio of not less than about 1.7.

3. The laminated sheet according to claim 1, wherein the polypropylene resin is a long chain branch-carrying polypropylene resin.

4. The laminated sheet according to claim 1, wherein:
   the polypropylene resin has an intrinsic viscosity of less than about 3 dl/g and a ratio, Mw/Mn, of a weight average molecular weight, Mw, to a number average molecular weight, Mn, of less than about 10; and
   the polypropylene resin comprises:
   (i) a crystalline polymer component (A) having an intrinsic viscosity of not less than about 5 dl/g; and
   (ii) a crystalline polymer component (B) having an intrinsic viscosity of less than about 3 dl/g;
   the crystalline polymer component (A) being prepared by polymerizing propylene alone or propylene with at least one monomer selected from the group consisting of ethylene and α-olefins having 4 to 12 carbon atoms;
   the crystalline polymer component (B) being prepared by polymerizing propylene alone or polymerizing propylene with at least one monomer selected from the group consisting of ethylene and α-olefins having 4 to 12 carbon atoms; and a content of the crystalline polymer component (A), based on the sum of the crystalline polymer component (A) and the crystalline polymer component (B), being from about 0.05% by weight to about 35% by weight.

5. The laminated sheet according to claim 4, wherein the crystalline polymer component (A) satisfies a relationship represented by the following formula (2), $$W_A \geq 400 \times \mathrm{EXP}(-0.6 \times [\eta]_A) \tag{2}$$

wherein $[\eta]_A$ (dl/g) is the intrinsic viscosity of the polymer component (A) and $W_A$ (% by weight) is the content thereof, based on the sum of the crystalline polymer component (A) and the crystalline polymer component (B).

6. The laminated sheet according to claim 4, wherein the crystalline polymer component (A) and the crystalline polymer component (B) contain independently of each other:

a propylene homopolymer;

an ethylene/propylene random copolymer having a content of a repeating unit derived from ethylene of not more than about 10% by weight;

a propylene/butene random copolymer having a content of a repeating unit derived from butene of not more than about 30% by weight; or an ethylene/propylene/butene random copolymer having a content of a repeating unit derived from ethylene of not more than about 10% by weight and a content of a repeating unit derived from butene of not more than about 30% by weight.

7. The laminated sheet according to claim 4, wherein the crystalline polymer component (A) has an intrinsic viscosity of not less than about 7 dl/g.

8. The laminated sheet according to claim 1, wherein:

the polypropylene resin has an intrinsic viscosity of less than about 3 dl/g and a ratio, Mw/Mn, of a weight average molecular weight, Mw, to a number average molecular weight, Mn, of less than about 10; and the polypropylene resin is produced by a process comprising the steps of:

(i) carrying out a first step of polymerizing propylene alone or polymerizing propylene with at least one monomer selected from the group consisting of ethylene and α-olefins having 4 to 12 carbon atoms to obtain a crystalline polymer component (A) having an intrinsic viscosity of not less than about 5 dl/g; and (ii) carrying out, in the presence of the crystalline polymer component (A), a second step of polymerizing propylene alone or polymerizing propylene with at least one monomer selected from the group consisting of ethylene and α-olefins having 4 to 12 carbon atoms to obtain a crystalline polymer component (B) having an intrinsic viscosity of less than about 3 dl/g;

a content of the crystalline polymer component (A), based on the sum of the crystalline polymer component (A) and the crystalline polymer component (B), being from 0.05% by weight to 35% by weight.

9. The laminated sheet according to claim 8, wherein:

a polymerization velocity of the crystalline polymer component (A) in the first step is not less than about 2000 g per 1 g of a solid catalyst component and 1 hour of a polymerization period of time;

a polymerization velocity of the crystalline polymer component (B) in the second step is not less than about 4000 g per 1 g of the solid catalyst component and 1 hour of a polymerization period of time; and the solid catalyst component comprises titanium, magnesium and a halogen.

10. The laminated sheet according to claim 1, wherein the polypropylene resin comprises:

(i) a long chain branch-carrying polypropylene resin; and (ii) a resin which is produced by a process comprising the steps of:

(1) carrying out a first step of polymerizing propylene alone or polymerizing propylene with at least one monomer selected from the group consisting of ethylene and α-olefins having 4 to 12 carbon atoms to obtain a crystalline polymer component (A) having an intrinsic viscosity of not less than about 5 dl/g; and (2) carrying out, in the presence of the crystalline polymer component (A), a second step of polymerizing propylene alone or polymerizing propylene with at least one monomer selected from the group consisting of ethylene and α-olefins having 4 to 12 carbon atoms to obtain a crystalline polymer component (B) having an intrinsic viscosity of less than about 3 dl/g;

a content of the crystalline polymer component (A), based on the sum of the crystalline polymer component (A) and the crystalline polymer component (B), being from 0.05% by weight (inclusive) to 35% by weight(exclusive).

11. The laminated sheet according to claim 1, wherein the expansion ratio is from about 4 to 10.

12. The laminated sheet according to claim 1, wherein the foamed sheet is produced using a mixed gas of nitrogen gas and carbonate gas as a foaming gas in a foaming process for producing the foamed sheet.

13. The laminated sheet according to claim 1, wherein the non-woven fabric is made of a polypropylene resin.

14. A car interior part, which comprises a material containing a laminated sheet that comprises:

(i) a foamed sheet containing a polypropylene resin; and (ii) a non-woven fabric, wherein the foamed sheet has an expansion ratio, $\chi$, of from about 2 to 10, a cell diameter of not more than about 300 μm, and a thickness, h (cm), satisfying the following formula (1), $$(100/E(1-(1-1/\chi)^{2/3}))^{1/3} \leq h \leq 2 \tag{1}$$

wherein E (kgf/cm$^2$) is a modulus of elasticity in bending of the resin which is to be a constituent of the foamed sheet and not yet foamed.

15. The car interior part according to claim 14, wherein the car interior part is a car interior ceiling or a car interior trunk mat.

* * * * *